United States Patent [19]
Campau

[11] Patent Number: 5,353,957
[45] Date of Patent: Oct. 11, 1994

[54] APPARATUS AND METHOD FOR CONTROLLED DISPENSING OF A LIQUID

[75] Inventor: Daniel N. Campau, Grand Rapids, Mich.

[73] Assignee: Flow-Rite Controls, Ltd., Grand Rapids, Mich.

[21] Appl. No.: 56,431

[22] Filed: Apr. 30, 1993

Related U.S. Application Data

[63] Continuation-in-part of Ser. No. 882,169, May 12, 1992, abandoned, which is a continuation-in-part of Ser. No. 833,831, Feb. 18, 1992.

[51] Int. Cl.$^5$ .............................................. B67D 3/00
[52] U.S. Cl. ...................................... 222/1; 222/479; 4/225.1; 4/227.5
[58] Field of Search ............... 222/57, 192, 585, 479, 222/1; 4/225.1, 227.4, 227.5, 227.6

[56] References Cited

U.S. PATENT DOCUMENTS

| | | | |
|---|---|---|---|
| 1,213,978 | 1/1917 | Thornton | 4/227.5 |
| 1,623,132 | 4/1927 | Pennell et al. | 4/227.5 X |
| 1,728,737 | 9/1929 | Stoner | 4/227.5 |
| 4,507,811 | 4/1985 | Buelow et al. | 4/225.1 |

FOREIGN PATENT DOCUMENTS 8621 of 1903 United Kingdom ................ 4/227.5

Primary Examiner—Gregory L. Huson
Attorney, Agent, or Firm—Niro, Scavone, Haller & Niro

[57] ABSTRACT

An apparatus and method are disclosed for dispensing a first liquid into a second reservoir liquid. The apparatus comprises a container adapted to hold the dispensable liquid, a dispensing nozzle and a sensing tube. The dispensing nozzle is positioned on the container below the dispensable liquid level within the container. The sensing tube has first and second open ends, the first open end positioned above the dispensable liquid level within the container and the second open end positioned outside the container and below the dispensing nozzle. The second open end of the sensing tube is immersible in the reservoir liquid, whereby the cyclic fall and rise of the reservoir liquid results in the controlled discharge of the dispensable liquid from the container through the dispensing nozzle. The method comprises the steps of providing a container as described above, locating the container above the reservoir liquid, and causing the reservoir liquid to rise and fall to discharge the dispensable liquid from the dispensing nozzle.

14 Claims, 2 Drawing Sheets

APPARATUS AND METHOD FOR CONTROLLED DISPENSING OF A LIQUID

This application is a continuation-in-part application of U.S. Ser. No. 07/882,169, filed May 12, 1992 now abandoned, which in turn is a continuation-in-part application of U.S. Ser. No. 07/833,831, given an effective filing date of Feb. 18, 1992.

BACKGROUND OF THE INVENTION

The present invention is directed generally to a liquid dispensing apparatus and method and, more particularly, to a device and method capable of dispensing a controlled volume of an additive liquid into a reservoir liquid.

There are a variety of applications which require some form of device or apparatus that is capable of dispensing a first liquid into a second reservoir liquid. Examples of such applications include chemical processes, plating processes, fertilizer and food processing, and a wide variety of other liquid metering applications. One particularly desirable use of such a dispensing apparatus is to dispense a liquid cleaner into a toilet bowl.

Various prior art liquid dispensers have been widely used for dispensing liquid toilet bowl cleaner. The most commercially successful dispensing containers use a float valve which opens and closes with changes in the toilet tank level during a flush cycle. These dispensers are designed to fill a small receptacle on the top of a float during the fall in the tank water level and then, during the rise in tank water level, to displace the cleaner liquid from the receptacle and into the tank. Problems exist with this method and its implementation. For example, the method is very inefficient. The objective, of course, is to keep the toilet bowl clean, not the water holding tank. Since all the cleaner is dispensed into the tank, rather than the bowl, most of it is flushed down the drain without cleaning the bowl at all. Due to loss down the drain, less than 10% of the cleaner liquid actually is retained in the bowl. Even solid bowl cleaners, which slowly dissolve in the holding tank, share the same inefficient performance as the liquids, since 90% or more is flushed down the drain without doing any substantial cleaning. The prior art float dispenser apparatus are also susceptible to variations in performance. Surface tension, foaming, and dimensional variations can cause complete blockage of the system or great variations in the amount of cleaner dispensed. Because of the significant variation that occurs, it is also difficult to apply such apparatus to the dispensing of small volumes. Most liquid toilet bowl cleaners are formulated to be dispensed in one milliliter quantities. This requires a 12 oz. bottle to provide enough liquid for 350 flushes, or about one month's typical usage. The size of the 12 oz. container is too large to fit in many toilet tanks limiting the use of the product.

Other prior art dispensing apparatus have been tried, but all are either incapable of dispensing accurately the small volume of liquid required, or they are incapable of dispensing during the time period required for most efficient operation. For example, U.S. Pat. No. 1,728,737 to Stoner; U.S. Pat. No. 1,213,978 to Thornton; U.K. Patent No. 8621 and French Patent 2,613,743 all disclose a container of liquid mounted above the tank level with a vent tube extending down below tank level. When the tank level is dropped, air is allowed to enter the container, enabling liquid additive to drain out of the container. These systems have proved impractical because they either dispensed too great a volume (e.g., the '978 Thornton, '621 Great Britain and '743 French patents) and/or they dispensed at an inappropriate time in the flush cycle (all cited patents). This inefficiency was due to the necessary use in the prior art of a vent tube large enough in diameter to empty itself of water as the tank level dropped, thereby allowing air to enter the container through the vent tube. The large diameter vent tube results in a large dispensed volume of additive because water moving inside the vent tube displaces an equal volume of additive from the container. If the vent tube penetrates the tank level a substantial amount (for the purpose of delaying the onset of dispensing), this results in a relatively large volume of water inside the vent tube. If the vent tube is adjusted so that its lowest portion just contacts the water at its highest level, then dispensing begins immediately upon commencement of the flush cycle, wasting considerable additive. In either case, a dip tube vent approach is not satisfactory for dispensing a small controlled volume of liquid.

U.S. Pat. No. 4,507,811 to Buelow, et al. recognized the improved efficiency made possible by dispensing additive into the overflow pipe rather than into the tank. However, the disadvantage of the Buelow device is that it requires toilet tank water to mix with the additive. In Buelow, solid cakes are dissolved to a saturated solution and dispensed in a pre-set amount. However, if a liquid additive, rather than a solid were used, the additive would be continually diluted with each flush. The Buelow device is therefore insufficiently accurate for dispensing small controlled volumes of liquid additives. The Buelow device also has the disadvantage that it must be mounted below the tank waterline. The Buelow dispenser is therefore impractical for use in many installations in which the flushing mechanism would interfere with the mounting of the Buelow device. The dissolving of solids has the inherent disadvantage of being time dependent. A second flush cycle may occur too fast to allow sufficient time for the solution to become saturated, thereby resulting in inadequate cleaner concentration in the bowl.

In still another prior art device, U.S. Pat. No. 1,623,132 to Pennell, et al., the change in one reservoir level is used to control the dispensing of a liquid additive into the same reservoir. Pennell's device is complicated in that it uses an inverted U-tube as a level sensing tube in order to block air from entering the additive container. This U-tube is filled with liquid, allowing a pressure balance condition to develop to prevent liquid from draining out of the additive container. A disadvantage to the Pennell design is that the end of the U-tube is situated directly below the discharge nozzle so that when the container is inverted upon installation, the liquid discharged through the nozzle will fill the U-tube and establish the pressure balance. If the U-tube is not aligned with the nozzle, the entire contents of the container will run out. Thus, the Pennell device dispenses additive into the same reservoir as the controlling liquid, i.e., the tank, rather than into an overflow tank.

Overflow mounting is practical only if the container is very small. Since at least a one month's supply is needed in a practical toilet bowl cleaner container, the amount dispensed each cycle must be very small. A practical overflow mounted dispenser is limited to about 3 ounces in volume. For a month's service, this requires a dispensed volume of about 0.25 ml per cycle, or about 5 drops of liquid. It is critical therefore that this small volume be dispensed at the proper time in the cycle, or it may fail to be adequately mixed with the bowl water. There is a fairly limited combination of dimensions that will dispense the proper amount at the right time. It has been determined that the dispensed volume and timing are significantly affected by the maximum water level, which can vary from one installation to another. It is desirable that these variations do not significantly affect the amount dispensed and it is desirable to have a container that does not need to be adjusted in any way upon installation.

There exists, therefore, a need in the art for a more efficient and effective apparatus and method for dispensing a small, accurately controlled volume of liquid into another liquid reservoir and particularly for dispensing a small volume of liquid toilet bowl cleaner directly into a toilet bowl. For greatest utility, such an apparatus must be small enough to be mounted directly onto the overflow pipe.

SUMMARY OF THE INVENTION

The present invention is directed to a novel apparatus and method for dispensing a small controlled volume of a first liquid into a second reservoir liquid reliably and efficiently. The invention as applied to liquid toilet bowl cleaner dispensing is directed to the use of a positive displacement pumping means, having no moving parts, for dispensing a small, controlled volume of additive into the overflow pipe without mixing with the toilet tank refill water.

The liquid dispensing apparatus of the present invention includes a container adapted to hold a dispensable liquid, thereby defining a dispensable liquid level within the container. The container also includes a dispensing nozzle and a sensing tube. The dispensing nozzle has a discharge port at its distal end and is positioned on the container below the liquid level within the container. The sensing tube has first and second open ends, the first open end positioned above the liquid level within the container, and the second open end positioned outside the container and below the nozzle discharge port. The second open end of the sensing tube is immersible in the reservoir liquid, whereby the cyclic fall and rise of the reservoir liquid level results in the controlled discharge of the dispensable liquid from the container through the dispensing nozzle. The diameters of the second open end of the sensing tube and the discharge nozzle are selected such that a sufficient amount of surface tension develops so as to block air from entering the sensing tube and the discharge nozzle and to allow a balanced pressure condition to develop. Accordingly, the dispensable liquid is prevented from flowing whenever this balanced pressure condition exists.

The apparatus of the present invention finds particular application as a toilet bowl cleaner dispenser which automatically dispenses the cleaner and uses the change in water level within the tank to act as a power source to effect metered pumping of the toilet bowl cleaner. The unique use of surface tension to create the balanced pressure condition enables a very small, precise volume of cleaner liquid to be added at the most efficient point during the flush cycle, and also enables the liquid to be dispensed into the overflow without mixing with the tank refill water.

The present invention is also directed to a toilet bowl cleaner dispenser and method in which the cleaner is dispensed into the overflow tube of the tank during the bowl refill portion of the tank level cycle.

The present invention is also directed to a liquid dispensing apparatus in which air enters the container and the dispensable liquid leaves the container through the same discharge port without the need for squeezing and relaxing the container during use and without the need for moving parts, mechanical valves or inverted U-tubes.

The present invention is further directed to a liquid dispensing apparatus in which the dispensable liquid is prevented from flowing from the container due to a balanced pressure condition which arises from the surface tension of the liquids involved.

The present invention is directed to an apparatus in which the sensing tube in communication with the liquid reservoir can be varied in shape or orientation to control the volume of liquid dispensed.

The method of the present invention includes the steps of (1) providing a container adapted to hold a first liquid, the container having a dispensing nozzle and a sensing tube; (2) providing a sensing tube with an external, open end sized so that the surface tension of the liquid will prevent the passage of air when the opening is wetted; (3) locating the container above a second reservoir liquid; and (4) causing the second reservoir liquid level to rise and fall relative to the external open end of the sensing tube such that the external open end is below the reservoir liquid level during at least a portion of the rise and fall cycle and the nozzle discharge port is always positioned above said second reservoir liquid level.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
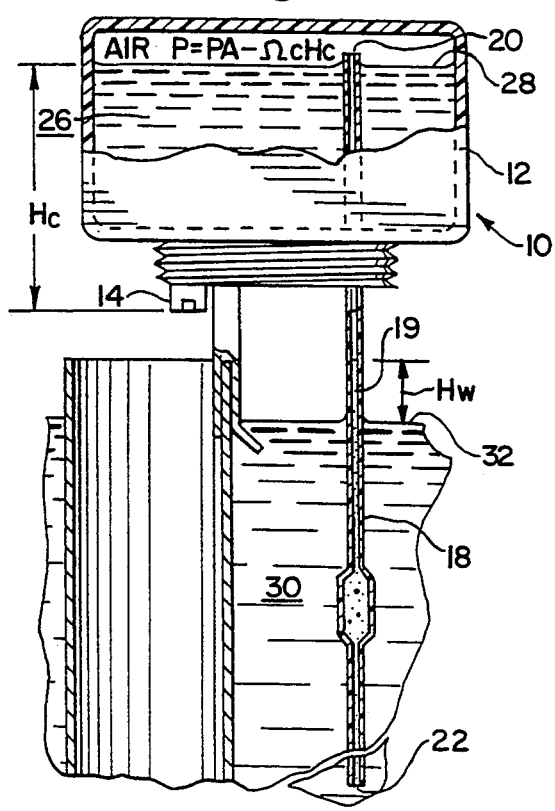
FIG. 1 is a side elevational view, in partial cross-section, illustrating the apparatus of the present invention mounted to the overflow pipe within a toilet tank, and showing the toilet tank water at its high liquid level position.

With reference now to FIG. 1, the liquid dispensing apparatus of the present invention is illustrated and designated generally as 10. The dispensing apparatus 10 includes a generally rigid container 12 having a dispensing nozzle 14 and a sensing tube 18. The container 12 may be of any size, shape, or configuration suitable to act as a suitable receptacle for the dispensable liquid 26. Typically, the container 12 is manufactured from a moldable plastic material. The dispensing nozzle 14 is positioned on container 12 at a point below the level 28 of the dispensable liquid and includes at its distal end a discharge port 16. The sensing tube 18 includes a first open end 20 which is positioned within container 12 above the level 28 of dispensable liquid 26. The sensing tube 18 also includes a second open end 22 which is positioned outside of container 12 and at a vertical position below discharge port 16. As described in greater detail below, the sensing tube 18 also includes at least a portion of its length having an enlarged cross-section 24 which serves to insure that the proper amount of liquid is dispensed at the appropriate time during the dispensing operation.

When the container 12 is initially positioned as illustrated in FIG. 1 with the dispensing nozzle 14 and sensing tube 18 depending from the container, some of the dispensable liquid 26 will drip from the nozzle until a balanced pressure condition develops within the container. This pressure condition may be defined by the following formula:

$$P = Pa - \Omega c Hc$$

where Pa is the ambient pressure, $\Omega c$ is the weight density of the dispensable liquid 26, and Hc is the pressure head developed by the dispensable liquid. This balanced pressure condition prevents further dispensable liquid from running out of the container. The column of liquid, Hw, in the sensing tube 18 reaches an equilibrium height that corresponds to the height of the liquid in the container 12 according to the following formula:

$$Hw = (\Omega c / \Omega w) Hc$$

where $\Omega w$ is the weight density of reservoir liquid.

Figure 2:
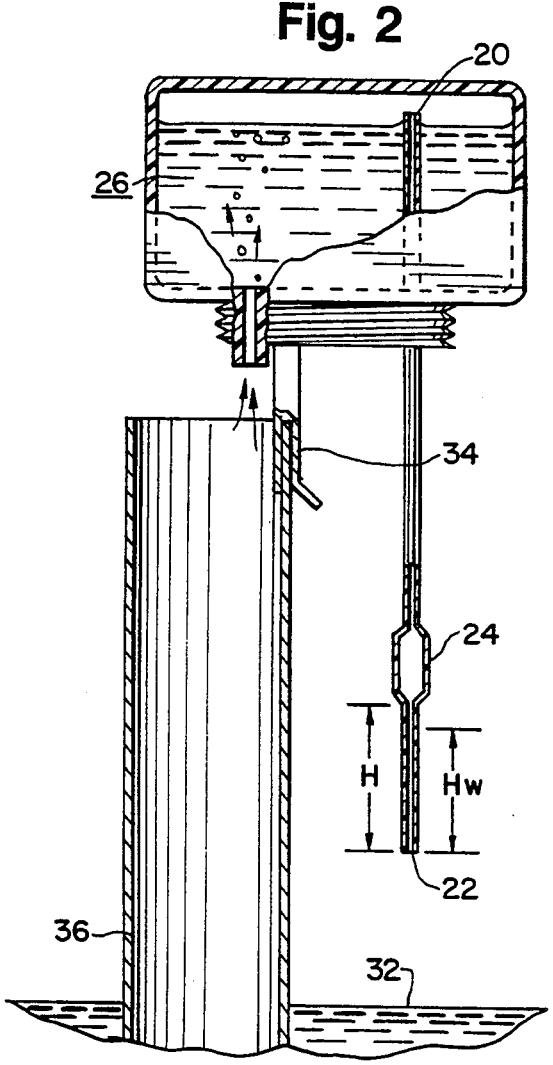
FIG. 2 is again a side elevational view, in partial cross-section, similar to that of FIG. 1, but showing the toilet tank water at its low level position.

As the reservoir liquid level 32 begins to drop, the column of liquid 19 within the sensing tube also begins to drop through the sensing tube. As it drops, air is drawn into the top of the container 12 through nozzle 14. When the reservoir liquid 32 reaches its low level position which may be below the second open end 22 of the sensing tube, as illustrated in FIG. 2, the column of liquid 19 does not completely drain from the sensing tube, also as shown in FIG. 2. Rather, the column of liquid 19 remains trapped inside the sensing tube due to the negative pressure head at the top of the tube (inside the container) and due to the surface tension of the dispensable liquid at the dispensing nozzle 14 and due to the surface tension of the liquid at second open end 22. Of course, in keeping with the formula noted above, Hw decreases as the contents of the bottle are used up and Hc decreases. When the liquid level 28 in container 12, Hc is very low, surface tension at the nozzle 14 and at the second open end 22 governs the height of Hw. Preferably, the length of the sensing tube H, illustrated in FIG. 2, is of a length greater than the maximum Hw so that the enlarged cross-sectional area of the sensing tube 24 always fills with air when the reservoir level 32 drops. This assures a consistent dispensed volume throughout many cycles of the dispensing operation.

Figure 3:
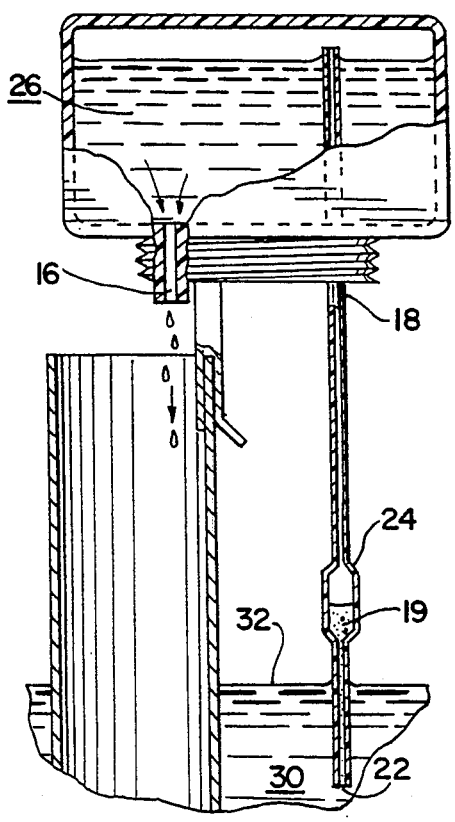
FIG. 3 is a side elevational view, in partial cross-section, similar to FIGS. 1 and 2, but showing the toilet tank water liquid level rising.

As the reservoir liquid level 32 begins to rise, as illustrated in FIG. 3, it in turn causes the liquid column 19 within sensing tube 18 to rise, thereby displacing air inside the sensing tube. Thus, air is forced from first open end 20 of sensing tube 18 into the upper portion of container 12, which in turn pushes the dispensable liquid 26 out the discharge port 16 of the dispensing nozzle 14.

An increase in the cross-sectional dimension of the sensing tube such as illustrated at bulge 24 can be used to control the amount and timing of the dispensed volume. The bulge 24 is best located below the lowest maximum reservoir liquid level 32 to assure proper dispensed volume. It is also desirable to have the bulge located as low as practical so that the dispensable liquid 26 has more time to mix with the bowl liquid.

Where the reservoir liquid level 32 has a maximum that can vary, it desirable to use a small diameter sensing tube with a bulge volume establishing the largest portion of dispensed volume.

Dimensions of the dispensing nozzle 14 in terms of its length and the internal diameter of discharge port 16, together with the length of sensing tube 18 and the internal diameter of the second open end 22, will vary depending upon the amount of liquid 26 to be dispensed, the rise and fall of the reservoir liquid level 32 and the surface tension of the dispensing liquid and reservoir liquids. As the surface tension of the dispensing liquid decreases, for example by the inclusion of surfactants, a smaller internal diameter for discharge port 16 may be necessary for a given volume of dispensed liquid 26 being discharged during the dispensing cycle.

The dispensing apparatus 10 of the present invention also can include a means for mounting the container 12 above the reservoir liquid, such as mounting clip 34 which can conveniently be attached to the uppermost end of a toilet tank overflow pipe 36. In this way, the dispensing nozzle 14 is positioned above the overflow pipe so that the dispensable liquid 26 is dropped directly into the overflow pipe 36 and thereby directly into the toilet bowl, without entering the main water tank. In this way, the cleaner is dispensed directly into the bowl in a more concentrated form and is not used as a part of the flushing liquid, which is primarily passed directly into the toilet drain. Accordingly, the present invention is much more efficient in its use of cleaner.

The present invention facilitates the effective use of an overflow mounting by using a sensing tube with a low sensitivity to level change (i.e., a diameter that results in a small change in dispensed volume given a change in tank level). A tube diameter of 0.06 inches, for example, results in a displacement of 0.046 ml of additive per inch of water level change, or about one drop per inch. Setting the nominal dispensing rate at 5 drops per cycle for a maximum tank level 1 inch below the overflow will yield an installation variation of $+/-1$ drop for the range of maximum tank level settings between the top of the overflow to 2 inches below. Thus, for this sensing tube diameter, the controlled volume for a given installation will be 4 to 6 drops with a standard deviation of less than one drop.

It is desirable to discharge the cleaner early in the bowl refill cycle (after all drain-off has occurred). This means the sensing tube must extend well down below the maximum tank water level. The dispensing of a small volume of liquid additive therefore requires a small diameter sensing tube. A further advantage is obtained by enlarging the diameter of a portion of the sensing tube to increase the volume dispensed while the tank level is low, and using a reduced tube diameter above the enlarged region to reduce the dispensing rate as the level rises. This smaller diameter must extend well above the maximum level of the tank water because the liquid in the sensing tube rises above the tank level as the balanced pressure condition is reestablished.

Further, the nozzle discharge port and the external opening in the sensing tube must each be sized so as to allow surface tension to develop to prevent liquid from draining out either port. However, if these openings are too small, the dispensing flow may become too slow for optimum timing. It has been determined that for typical toilet bowl cleaning liquids, a diameter of 0.125 inch for the discharge nozzle and 0.06 inch for the external opening of the sensing tube function well.

More specifically, it has been determined that with the end of the sensing tube extending to a point 3 inches below the maximum water level, the nominal dispensing volume can be set to 5 drops per cycle. If the maximum tank level is 1 inch below the overflow, then the dispensed volume will vary $+/-1$ drop for the range of maximum tank level settings between the top of the overflow to 2 inches below. Thus, for a diameter of 0.125 inch for the discharge nozzle and 0.06 inch for the external opening of the sensing tube, the controlled volume for a given installation will be 4 to 6 drops with a standard deviation of less than one drop. Proper performance requires that the sensing tube retain liquid by surface tension. When first inverted, the sensing tube contains container liquid. After a number of cycles, this liquid is displaced by water. In both cases, surface tension must be adequate to block air from entering the sensing tube. Water has a surface tension of 0.005 lb./ft. Cleaning liquids typically have a much lower surface tension than water (due to the presence of surfactants). The surface tension of the cleaning liquid therefore dictates the maximum diameter of the end of the sensing tube. It has been found preferable to use a small diameter sensing tube, on the order of 0.06 in., to assure retention of liquid and to prevent any air from being pushed into the tube as the level rises and contacts the end of the sensing tube.

It should now be understood that the surface tension at the discharge nozzle and at the external opening of the sensing tube assure that air entry through the sensing tube is blocked when the tank level drops below the end of the sensing tube, thus giving rise to a balanced pressure condition to block the discharge of liquid from the discharge nozzle. Surface tension is also necessary at both ports when the container is first inverted and installed. It limits the discharge of liquid to a very small amount as the pressure balance condition develops.

Figure 4:
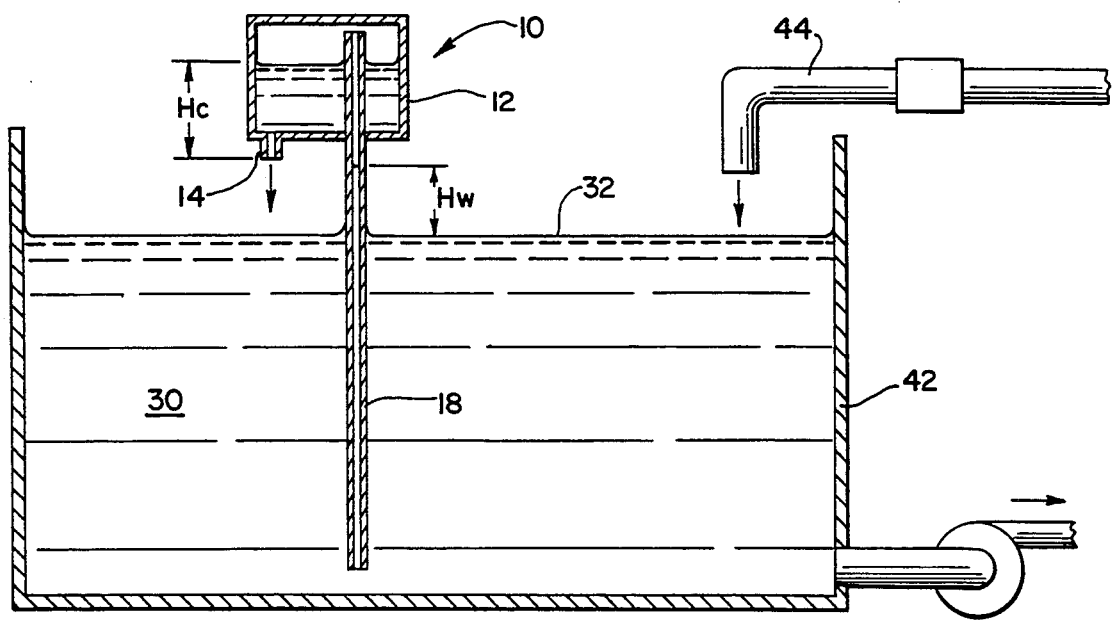
FIG. 4 is a side elevational view, in schematic format, illustrating the apparatus of the present invention for use in dispensing an additive liquid into a reservoir.

FIG. 4 is a schematic representation of the present invention showing its general application for providing a dispensable or additive liquid 26 to be mixed with a reservoir liquid 30. In accordance with this general application, the mixture of additive liquid 26 and reservoir liquid 30 is used in a predetermined processing application wherein over time the liquid level 32 falls within tank 42. When the reservoir liquid is replenished using refill system 44, the reservoir liquid level 32 rises and additive liquid 26 is dispensed via dispensing nozzle 14 into the reservoir liquid in the same manner as described previously. One of ordinary skill in the art will appreciate that a plurality of dispensing apparatus 10 can be used to provide several different additive liquids to tank 42 each being dispensed in its own relative proportion to the change in reservoir liquid level 32.

Those skilled in the art will also appreciate that by changing the cross-sectional dimension of sensing tube 18 along its length, the volume of liquid dispensed as the reservoir liquid level rises will change. Thus, by adjusting the cross-sectional dimension of the sensing tube 18, and knowing the predetermined rise of reservoir liquid level, the precise volume of dispensed liquid added to the reservoir liquid can be tailored for any given application.

It will be appreciated by those skilled in the art that various changes and modifications can be made to the illustrated embodiments without departing from the spirit of the present invention. Also modifications and changes are intended to be covered by the appended claims.

What is claimed is:

1. A liquid dispensing apparatus, comprising:
 a container adapted to hold a dispensable liquid, thereby defining a liquid level within said container;
 a dispensing nozzle having a discharge port, said nozzle being positioned on said container below the liquid level within the container; and
 a sensing tube terminating at a first open end positioned above said liquid level within said container and at a second open end positioned outside said container below said nozzle discharge port, said second open end of said sensing tube also being immersible in a control liquid, and said sensing tube having an internal diameter at said open end such that the surface tension of liquid within said sensing tube at said second open end prevents the passage of air through said sensing tube into said container, whereby the periodic fall and rise of said control liquid level between low and high control liquid levels results in the controlled discharge of said dispensable liquid from said dispensing nozzle.

2. The liquid dispensing apparatus of claim 1 wherein said sensing tube has an enlarged cross section along at least a portion of its length, said enlarged cross section portion of said sensing tube being positioned above the low control liquid level and at least partially below said high control liquid level.

3. The liquid dispensing apparatus of claim 2 wherein said sensing tube enlarged cross section portion terminates at a lower end which is positioned above any liquid level retained in said sensing tube when said control level is at its low level.

4. A method for controlling the dispensed volume of a first liquid into a first reservoir containing a second liquid, comprising the steps of:
 providing a container adapted to hold said first liquid, said container having (i) a dispensing nozzle with a discharge port and (ii) a sensing tube with a first open end located within the container above the first liquid level and a second open end located outside the container and below said nozzle discharge port, said sensing tube having an internal diameter at said open end such that the surface tension of liquid within said sensing tube at said second end prevents the passage of air through said sensing tube into said container;
 locating said container above the second liquid;
 causing the second liquid level to rise and fall relative to the second open end of said sensing tube such that said second open end is below the second liquid level during at least a portion of the rise and fall cycle whereas the nozzle discharge port is always above said second liquid level.

5. The method of claim 4 wherein said first liquid is discharged from said container through said nozzle as said second liquid level is rising and air is drawn into said container through said nozzle as said second liquid level is falling.

6. The method of claim 4 wherein said first liquid is dispensed into said second liquid in an amount that is proportional to the rising of the second liquid level above said second open end of said sensing tube.

7. The method of claim 4 wherein the first liquid is dispensed into a second reservoir in an amount that is proportional to the rise of the second liquid level above said second open end of said sensing tube, whereby no mixing of the first and second liquids occurs.

8. The method of claim 4 wherein the level of the second liquid undergoes cyclical rises and falls and the first liquid is dispensed at a generally constant rate during said cyclical rises and falls and independent of the level of the first liquid in said container.

9. An apparatus for dispensing a controlled volume of liquid toilet cleaner into a toilet bowl, comprising:
   a container adapted to hold liquid cleaner, thereby defining a liquid cleaner level within said container, said container being positionable in a toilet water tank above the water level in said tank;
   a dispersing nozzle having a discharge port, said nozzle being positioned on said container below the liquid cleaner level within the container;
   an overflow pipe located within the toilet bowl and positioned so that the output from said dispensing nozzle is in fluid communication with the water from said overflow pipe; and
   a sensing tube terminating at a first open end positioned above said liquid cleaner level within said container and at a second open end positioned outside said container below said nozzle discharge port, said second open end of said sensing tube having an internal diameter such that the surface tension of the liquid within said sensing tube at said second open end prevents the passage of air through said sensing tube into said container, said second open end of said sensing tube also being immersible in the water contained within said toilet tank, whereby the periodic fall and rise of said water level between low and high water levels results in the controlled discharge of said liquid cleaner from said dispensing nozzle, said discharge being directed into said overflow pipe without dilution by the water contained in the toilet tank.

10. The apparatus of claim 9 wherein said sensing tube has an enlarged cross section along at least a portion of its length, said enlarged cross section portion of said sensing tube being positioned above the low water level and at least partially below said high water level.

11. The apparatus of claim 9 wherein said sensing tube enlarged cross section portion terminates at a lower end which is positioned above any column of liquid retained in said sensing tube when said water level is at its low level.

12. The apparatus of claim 9 wherein said container includes a mounting bracket to support said container on an overflow pipe within said toilet tank.

13. A method for dispensing a toilet bowl cleaner liquid comprising the steps of:
   providing a container adapted to hold said liquid cleaner, said container having (i) a dispensing nozzle with a discharge port and (ii) a sensing tube with a first open end located within the container above the liquid cleaner level and a second open end located outside the container and below said nozzle discharge port, said second end having an inner diameter such that the surface tension of liquid within said sensing tube at said second end prevents passage of air through said sensing tube into said container;
   locating said container above the water contained in a toilet tank;
   causing the water level to fall and rise relative to the second open end of said sensing tube such that said second open end is below the tank water level during at least a portion of the fall and rise cycle whereas the nozzle discharge port is always above said water level, to thereby dispense said liquid cleaner from said container only as said tank water level is rising.

14. The method of claim 13 wherein said liquid cleaner is dispensed through an overflow pipe within said toilet tank and into the toilet bowl without dilution by the water contained in the toilet tank.

* * * * *

UNITED STATES PATENT AND TRADEMARK OFFICE
CERTIFICATE OF CORRECTION

PATENT NO. : 5,353,957
DATED : October 11, 1994
INVENTOR(S) : Daniel N. Campau

It is certified that error appears in the above-indentified patent and that said Letters Patent is hereby corrected as shown below:

Column 9, line 1, "rising" should be "rise"

Column 9, claim 9, line 7, "dispersing" should be —dispensing—

Signed and Sealed this

Twentieth Day of December, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,353,957
DATED : Oct. 11, 1994
INVENTOR(S) : Daniel N. Campau

It is certified that error appears in the above—identified patent and that said Letters Patent is hereby corrected as shown below:

Column 5, Line 37, "32" should be "30"
Column 6, Line 7, "is" should be inserted between "it" and "desirable"
Column 8, Line 38, "control" should be inserted after "any"
Column 8, Line 39, delete "level"
Column 8, Line 40, delete the first occurance of "level" and substitute "liquid"
Column 8, Line 42, delete "first" before "reservoir"
Column 10, Line 11, "liquid" should be "water"
Column 10, Line 8, "9" should be "10"
Column 10, Line 24, insert "open" between "second" and "end"

Signed and Sealed this

Twenty-first Day of November, 1995

BRUCE LEHMAN

Attest:

Attesting Officer

Commissioner of Patents and Trademarks